United States Patent Office 3,437,441
Patented Apr. 8, 1969

3,437,441
PROCESS OF PRODUCING HIGHLY POROUS AND REACTIVE SILICA MATERIALS
Robert K. Mays and Orlando Leonard Bertorelli, Havre De Grace, Md., assignors to J. M. Huber Corporation, Borger, Tex., a corporation of New Jersey
No Drawing. Continuation-in-part of application Ser. No. 149,964, Nov. 3, 1961, now Patent No. 3,328,125, June 27, 1967. This application Mar. 15, 1967, Ser. No. 623,231
The portion of the term of the patent subsequent to June 27, 1984, has been disclaimed
Int. Cl. C01b 33/00
U.S. Cl. 23—182          13 Claims

ABSTRACT OF THE DISCLOSURE

Highly porous and reactive silica powder is produced by a violent frothing reaction, followed by digestion for several hours at 90°–105° C., of an aqueous suspension, acidified as by a nearly stoichiometric amount of sulfuric acid to an acid concentration of from 20 to 50% in the liquid medium, of fine particles of an anhydride obtained by strong calcination of finely divided kaolin at 500°–925° C., as by heating for at least 2 hours at 700°–900° C.

---

This is a continuation-in-part of our copending application, Serial No. 149,964 filed November 3, 1961, now United States Patent No. 3,328,125.

This invention relates to a process of producing particulate silica materials having distinctive chemical and physical characteristics and distinctive properties, including extremely high chemical reactivities and uniquely selective powers of sorption for substances of certain molecular sizes.

Finely divided siliceous materials of various kinds have been known heretofore. Among those which have found important uses as inorganic fillers, carriers, extenders or pigments are:

(1) The natural crystalline silicates or clays, such as kaolin;

(2) Finely pulverized quartz, which is a crystalline silica of little chemical reactivity composed of $SiO_4$ tetrahedra spirally linked into hexagonal prism structures;

(3) Precipitated silicic acid compositions, or hydrated silicas, which have $SiO_4$ tetrahedra and OH groups chaotically linked into minute spherical microcrystalline amorphous masses that tend to flock together;

(4) Pyrogenic or fumed silicas, which are discrete, anhydrous, spherical colloidal masses formed principally by siloxane (Si-O-Si) groupings; and (5) Very finely divided precipitated sodium aluminum silicates, such as those disclosed in United States Patent No. 2,739,073.

It has long been known that more or less impure siliceous materials are obtained as residues in the reaction slurries when particulate hydrous aluminum silicates such as kaolin or similar clays, either in the hydrous state or after calcination, are reacted in aqueous media with strong mineral acids for the extraction of alumina from the silicates, such, for example, as when reacting clay with sulfuric acid for the production of alum. Although there have been various proposals for producing or treating the residues so as to recover them in useful forms, these siliceous materials, or so-called silica residues, commonly have been separated from the reaction slurries and discarded for lack of substantial commercial value. As disclosed in U.S. Patent No. 2,848,346, however, an alum solution produced from kaolin and still containing the silica residue may be used successfully by reaction with sodium silicate for the production of a precipitated sodium aluminum silicate pigment of increased $SiO_2$ content.

According to the present invention, we have discovered that silica materials can be provided in an extremely reactive and sorptive particulate form in which the particles, unlike those of known particulate siliceous materials, are quite discrete paracrystalline particles having a distinctly hexagonal phylloidal or wafer structure characterized, among other things, by a very great width to thickness ratio, or thinness, extremely high porosity in the particles themselves and unique properties of chemical reactivity and of selective sorptiveness. The composition, form and properties of the particles make these new materials valuable for many important uses.

According to the present invention, we have discovered that such highly porous and reactive silica materials can be produced by the direct acid decomposition under atmospheric pressure conditions, through a violently frothing exothermic reaction and an ensuing digestion treatment, of a finely particulate metal silicate anhydride suspended in an aqueous medium, when the anhydride used is a suitable product of the high temperature heat treatment or calcination of a hydrous metal silicate of finely particulate form. The acid required for the process is a strong mineral acid capable of bringing about a violent exothermic reaction in the aqueous suspension of the anhydrous metal silicate, such, for example, as sulfuric acid. Nitric acid or hydrochloric acid or hydrogen chloride gas may also be used.

The silica materials can be produced quite advantageously by the use of extremely finely divided clays such as kaolin as the raw material. Kaolin is a naturally occurring hydrous aluminum silicate. In this way, a relatively inexpensive raw material will yield not only a more valuable new silica material but also a solution of an aluminum salt that is useful either as such or as a raw material for the production of other substances; for example, as a source of alum when sulfuric acid is used or, when nitric acid is used and is regenerated from the solution, as a source of alumina valuable for use in the production of aluminum or of other aluminum compounds.

In a process found effective for the production of the materials, a very finely particulate metal silicate, for example, a finely divided hydrous aluminum silicate such as a refined kaolin clay having its particles reduced to practically their elemental sizes, is first calcined by heating the material at a temperature between 500° and 925° C. for a period sufficient at least to render the silicate completely anhydrous. The resulting finely particulate anhydride is then suspended in an aqueous medium and reacted therein under atmospheric pressure conditions with a strong mineral acid, such as sulfuric acid, at a concentration sufficient to bring about a violent exothermic reaction in the mixture, which reaction is so violent that it requires limitation in order to keep the mixture in control. After this reaction has subsided, the mixture is digested for a period of hours at a temperature of 90° to 100° C., until more than 80% of the metal oxide content of the particles has been extracted and the resulting solid particles have attained the required high content of $SiO_2$. Then the suspended residual particles are separated from the reaction liquid, washed to remove soluble substances, and dried.

The heating temperature most effective for the calcination is about 700° to 900° C., and the most effective heating time in the use of batch calcination, such as in a muffle furnace, is generally at least 2 hours at 700° C., being longer for lower effective temperatures and shorter, if desired, for higher effective temperatures. The heating may be effected continuously by the use of a rotary kiln, a vertical kiln, or a fluidized bed calciner, any of which may be operated at, for example, 800° C. to give in a relatively short heating period the effects of a longer period of heating at the same temperature in a batch calciner.

The resulting heat treated material is an anhydrous aluminum silicate that still has the appearance of kaolin particles when examined by electron micrographs, and which displays no appreciable chemical reactivity to a 1-normal solution of NaOH nor any appreciable porosity by nitrogen adsorption tests. This material is crushed or otherwise disintegrated and then dispersed thoroughly in water; whereupon acid is added to the aqueous suspension and reacted with the suspended particles therein, under atmospheric pressure, at a concentration sufficient to produce the violent exothermic reaction in the reaction mixture.

The amount of acid required is in excess of 90% of the amount stoichiometric to the alumina content of the silicate. To obtain the desired products with economical utilization of the final liquid medium for the recovery of its aluminum content, the amount of acid used should be about 95 to 100% of such stoichiometric amount. While larger amounts of acid may be used, they do not contribute significantly to the quality of the silica material and may even be somewhat detrimental to its properties if as large as 120% of such stoichiometric amount; and in the use of sulfuric acid they leave objectionable amounts of free acid in the by-product aluminum sulfate.

In the formation of the acid reaction mixture, the amount of water used for suspension of the silicate particles is related to the amount and concentration of the acid added, so as to provide, preferably, an acid concentration of 30 to 50% in the aqueous medium of the mixture. A lower acid concentration of as little as 20% or less may, however, be used in some cases, but at the expense of a much longer time for development of the required violent exothermic reaction.

The acid preferably is added in quite concentrated form, in order to take advantage of its heat of dilution, or a supplemental heating of the acidified suspension may be employed to initiate the exothermic reaction if the heat of the dilution of the acid does not suffice. In the use of concentrated sulfuric acid, the heat of dilution is sufficient to raise the temperature of the reaction mixture, for example, from 20 to 30° C. to 75 to 85° C. Then, typically within 2 to 3 minutes after the acid is added, the violent exothermic reaction "kicks off" promptly, without any need for external heating, and the temperature of the mixture climbs abruptly from the values existing when the acid has been added to values in excess of 100° C.

This exothermic reaction and the attendant fast generation of heat everywhere within the reaction mixture are accompanied by violent boiling and frothing action which causes the mixture to expand and its level to rise in the reaction vessel. A very tall vessel is needed to contain the reaction. In mass production, however, even this does not suffice to prevent the reaction from going out of control or the mixture from becoming excessively frothed. The reaction can, however, be contained and controlled effectively by allowing the violent boiling to bring the mixture to a volume of not more than about 3 to 5 times its normal volume and then extracting from the mixture the excess heat continuing to be generated in it, so that it will not boil up in an uncontrolled condition.

The control of the frothing can be effected advantageously by the intermittent addition of relatively cold water to the violently reacting mixture. The water is distributed over the turbulent surface of the mixture, as by delivering it quickly through spray nozzles supplied from quick-opening valves. The added water not only absorbs excess heat of the reaction but also keeps the liquid medium sufficiently aqueous notwithstanding losses of its water content which occur, especially if reflux condensation of the evolved steam is not used, with the continuous evolution of steam from the boiling mixture. The water additions, however, should not be made so as to prevent or suppress the violence of the reaction; so they are begun after the violent reaction has kicked off and expanded the mass, are made intermittently so as to prevent the mass from expanding beyond a controllable level, but without reducing it to a quiescent state, and are continued for as long as needed for that purpose, for example, for a total period of about 20 to 25 minutes. The violent reaction then having run its course, the mass will subside to its normal volume of its own accord.

The reaction mixture is then digested at a temperature above 90° C., and at all events well below 105° C., while kept in vigorous agitation, for a period of hours sufficient to complete the required extraction of alumina from the silicate particles. The digestion is performed most advantageously at a temperature of 94° to 100° C. for a period of about 2 to 6 hours, with the use of external heat to maintain this temperature. This heat can be supplied by the introduction of steam directly into the mass or by heating the reaction vessel in any desired way, such as by a steam jacket or a gas fired or an electrically heated mantle.

During the digestion, the aqueous medium is kept at an acid concentration, calculated upon the amount of acid added to it and thus including both free and combined acid at this stage, or less than 50% and preferably between 20 and 40%. Such a concentration of approximately 30% is especially advantageous for the economical recovery of alum from the final reaction liquid. The concentration and the temperature desired for the digestion may be established by adding an additional quantity of relatively cold water to the reaction mixture when the exothermic reaction no longer tends to expand the mass and it has subsided to nearly its normal level. The dilution, however, should not bring the acid concentration below 15%, for this would prolong uneconomically the required period of digestion.

It is important that the acid concentration be less than 50% and the temperature less than 105° C. during the digestion. Higher acid concentrations and higher temperatures are detrimental to the recovery of the silica material with the desired high surface area and high porosity. In addition, they cause the silica material to be impregnated with detrimental amounts of acidity that cannot be removed by conventional filtration, washing and neutralization processes.

The properties and range of usefulness of the final silica material are greatly influenced not only by the conduct of the acid reaction but also by the conduct of the calcination. For example, a product obtained with a $SiO_2$ content of 67.5% by carrying out the calcination for 2 hours at 550° C. and reacting the resulting material, first exothermally and then by digestion for 4 hours at 94° C., in an aqueous suspension containing sulfuric acid in an amount equivalent to the $Al_2O_3$ content of the silicate, showed far less desirable properties, including a much lower reactivity, surface area and porosity, than do products produced in the same way excepting with the use of the anhydrous silicates resulting from calcinations for 2 hours at temperatures of 700° C., 800° C. and 900° C., respectively. Comparative data on properties of the several products are shown in Table I hereinbelow. As shown in the same table, however, the more valuable materials according to the invention may be obtained in the same way from the anhydrous silicates resulting from calcinations for much longer times at 550° C.

The process of the invention is further illustrated by the examples and the test data which follow.

EXAMPLE A 1,000 grams of a kaolin clay refined so as to have 55 to 60% of its particles smaller than 2 microns and only 20 to 25% of its particles coarser than 5 microns (an air-floated soft clay mined and refined at Langley, S.C.) was heated for 24 hours at 550° C., then cooled, and then dispersed thoroughly in 1505 grams of water containing 2.5 grams of tetrasodium pyrophosphate as a dispersing aid. The kaolin had a BET surface area of 14.9 m.²/g. and the following typical composition:

| | Percent |
|---|---|
| $Al_2O_3$ | 39.25 |
| $SiO_2$ | 45.12 |
| $Fe_2O_3$ | 0.71 |
| $TiO_2$ | 0.89 |
| CaO | 0.49 |
| MgO | 0.14 |
| $H_2O$ (combined) | 14.13 |

The dispersion of the heat-treated kaolin anhydride was acidified by the addition of 1190 grams of concentrated sulfuric acid (93.19%) having a specific gravity of 1.835. The acid was added quickly with vigorous agitation of the slurry, which was continued throughout the reaction. This quantity of acid was 100% of the amount stoichiometric to the $Al_2O_3$ content of the clay. It gave an acid concentration of 40.8% in the aqueous medium of the slurry.

Promptly after the completion of the acid addition, which itself brought the slurry to a considerably elevated temperature, a violent exothermic reaction occurred which in 2 minutes had resulted in a strong boiling and frothing action within the mass and a reaction temperature of 105° C. The mass was allowed to boil up in the reaction vessel to several times its normal volume. Then it was restrained against frothing farther, by the intermittent addition of tap water in increments of 100 to 200 grams each.

When the violent exothermic reaction had run its course and the mass had subsided to nearly its normal volume, a further addition of water was made to bring the slurry to a temperature of 94° C. and an acid concentration of 30%, calculated upon the amount of acid added at the outset. Altogether, 1,000 grams of water was used for the control of the frothing and the final adjustments of temperature and concentration.

The acid reaction was then completed by holding the slurry at 94° C. for 4 hours. At the end of this digestion period, the slurry was cooled and diluted with water and then filtered; the filter cake was washed with water to remove free acid and aluminum sulfate; and the washed solids were dried at about 105° C. and disintegrated in a pulverizer.

The silica material resulting was analyzed and tested in various ways, giving the data set forth in the last column of Table I.

EXAMPLE B

The dispersion and acid reaction procedure of Example A was followed with the use of the heat-treated aluminum silicates resulting from calcinations of the kaolin at 550° C. for periods of 2 hours and 8 hours, respectively, instead of 24 hours. The resulting final materials respectively gave the data set forth in the first and the next-to-last columns of the table below.

In the use of the silicate from the 2-hour calcination at 550° C., the acidified slurry did not reach a violent boiling condition. The maximum temperature measured was 96° C., and the slurry took 6 minutes to reach this temperature.

In the use of the silicate from the 8-hour calcination at 550° C., a boiling and frothing action occurred which brought the slurry to a measured temperature of 105° C. in 6 minutes, at which point the frothing control was initiated.

EXAMPLE C

The dispersion and acid reaction procedure of Example A was followed with the use of the heat-treated aluminum silicates resulting from 2-hour calcinations of the kaolin at temperatures of 700° C., 800° C. and 900° C., respectively, instead of 24 hours at 550° C.

The resulting silica materials respectively gave the data set forth in the second, third and fourth columns of the table.

TABLE

| Chemical analyses | Calcination for 2 hours | | | | Longer at 550° C | |
|---|---|---|---|---|---|---|
| | 550° C. | 700° C. | 800° C. | 900° C. | 8 hr. | 24 hr. |
| Percent $SiO_2$ | 67.5 | 84.4 | 86.8 | 88.6 | 77 | 85.3 |
| Percent bound $H_2O$ (loss at 900° C. from dry wt. at 105° C.) | 10.65 | 8.30 | 7.47 | 5.50 | 9.75 | 8.18 |
| Percent metal oxides | 21.85 | 7.30 | 5.73 | 5.90 | 13.24 | 6.52 |
| Reactivity: percent of $SiO_2$ content soluble in 30 min. in 1-N NaOH at 50° C., from sample at 39.6 g. $SiO_2$/liter | 67.4 | 96.0 | 95.1 | 96.0 | 81.5 | 93.5 |
| Silanol concentration, micromols/m.² of flat surface area | 42 | 129 | 148 | 148 | 74 | 135 |
| Acidity, mol eq./100 g | .005 | .004 | .003 | .003 | .004 | .005 |
| BET surface area: | | | | | | |
| Total, m.²/g | 200 | 398 | 457 | 457 | 313 | 418 |
| Flat area, m.²/g | 64 | 36 | 41 | 41 | 56 | 38 |
| Pore area, m.²/g | 136 | 362 | 416 | 416 | 257 | 380 |
| Percent of surface area in pores | 68 | 91 | 91 | 91 | 82 | 91 |
| Percent of volume in pores | 15 | 36 | 40 | 55 | 26.5 | 39 |
| Oil absorption, ml./100 g | 62 | 72 | 66 | 76 | 63 | 70 |
| Percent water absorption at 72 R.H. | 7 | 13.7 | 16.7 | 18 | 12.3 | 14.2 |
| Water tolerance given to salt | .50 | .59 | .64 | .72 | .54 | .58 |

In the use of the anhydrous silicate from the calcination at 700° C., the acidified slurry underwent a violent exothermic reaction bringing it in 4 minutes to a condition requiring the frothing control. Its measured temperature was then 105° C.

In the use of the silicates from the calcinations at 800° C. and 900° C., the exothermic reaction was extremely violent—so much so that it brought the respective slurries to measured temperatures of 111° C. and 113° C. in 1 minute in each case, raising their temperatures at the rate of about 65 to 70° C. per minute and thus requiring immediate initiation of the frothing control.

Other examples and tests have shown that silica materials according to the invention are not obtainable by the use of calcination temperatures either below 500° C. or above 925° C. Such materials may be obtained by the use of hydrochloric acid or nitric acid in the acid decomposition stage, instead of sulfuric acid, although the latter generally is preferred because of its lower cost and the greater convenience and efficiently of its use. Phosphoric acid, however, is not effective to give such materials, as it has little exothermic reactivity with the silicate and it forms and leaves residual phosphate and objectionable acidity in the products obtained which have neither the reactivity nor the porosity of the silica materials provided according to the present invention. The natural hydrous aluminum silicates suitable for use in the described process for the production of such materials include the various grades of finely divided refined kaolins commercially available, the weight of which is composed predominantly of discrete particles smaller than 10 microns in diameter.

The silanol concentrations given herein were determined by use of the Zerewitinoff Reagent method for determining active hydrogen, according to techniques described in Siggia, "Quantitative Organic Analysis Via Functional Groups" (Wiley & Sons, 1949), page 41, and Guenther, "Determination of Silanol with Grignard Reagent," Analytical Chemistry, vol. 3, No. 6 (June 1958), page 1118.

The numerical values of water tolerance given herein represent the number of milliliters of distilled water that is tolerated by a 100-gram sample of table salt containing 1% by weight of the conditioning material, up to the point at which the salt begins to coalesce or stick in a jar containing the sample, when the water is added from a burette in increments of 2 to 3 drops and the sample is tumbled in the jar for 1 to 2 minutes after each addition. Unconditioned table salt generally has a water tolerance of 0.06 to 0.18.

The term "kaolin" or "kaolin clay" as used herein includes those clays which in the raw state contain as their chief constituent one or more of the naturally occurring hydrous aluminum silicates, such as kaolinite or halloysite, the composition of which may be represented by the formula $$Al_2O_3 \cdot 2SiO_2 n \cdot H_2O,$$

$n$ generally being 2. The naturally occurring hydrous aluminum silicates or clays useful according to the invention generally contain $SiO_2$ and $Al_2O_3$ in a weight ratio of between about 1.0 and about 1.5.

The BET surface areas and porosity values given herein were determined by the well-known Brunauer, Emmett and Teller method ("BET Multilayer Absorption Theory," Journal of the American Chemical Society, vol. 60 (1938), p. 309), and according to methods described in Voet, "Determination of Pore Size Distribution," Rubber World, vol. 139 (1958), pp. 63, 232.

What we claim is:

1. The process of producing a highly porous and reactive particulate silica material, which comprises suspending in an aqueous liquid fine particles of an anhydrous aluminum silicate produced by the heat treatment of a finely divided kaolin composed predominantly by weight of discrete particles smaller than 10 microns in diameter at a temperature between 500° and 925° C. for a period at least equivalent in effect to an 8 hour batch heating of such kaolin at 550° C.; adding to the suspension a strong mineral acid the anion of which forms only a soluble salt with aluminum, in an amount exceeding 90% of that which is stoichiometric to the alumina content of said silicate and thus bringing the liquid medium to an acid concentration of from 20 to 50% by weight sufficient to produce a violent exothermic reaction in the suspension; upon initiation of said reaction allowing the acidified suspension to boil up but limiting the extent of its frothing under the heat of said reaction; after said reaction subsides digesting the reaction mass at a temperature from 90° to 105° C. with the liquid medium at an acid concentration from 15 to 50% calculated on the amount of acid added to the suspension for a period of hours sufficient to bring the extraction of metal oxide from the suspended particles up to more than 80% of their metal oxide content; and then separating the reaction liquid from the resulting solid particles.

2. A process as claimed in claim 1, said anhydrous silicate being a product of the heat treatment of a finely divided kaolin for at least 2 hours at a temperature between 700° and 900° C.

3. A process as claimed in claim 1, said acid being sulfuric acid.

4. A process as claimed in claim 1, the amount of said acid added being approximately that which is equivalent chemically to the alumina content of the suspended anhydrous silicate.

5. A process as claimed in claim 1, the acid being added so as to provide an acid concentration of 30 to 50% in the liquid of the suspension.

6. A process as claimed in claim 1, the acid being added in such concentrated form that the suspension is heated to a temperature sufficient to initiate the violent reaction by the heat of dilution of the acid.

7. A process as claimed in claim 1, the acidified suspension being allowed to boil up to several times its normal volume and then being prevented from frothing out of control by additions of relatively cold water to the violently reacting mass in amounts insufficient to quench the violent reaction.

8. A process as claimed in claim 1, said digesting being effected at a temperature between 90° and 100° C.

9. A process as claimed in claim 1, said digestion temperature and concentration being established in the mass by the addition of relatively cold water thereto when the violent frothing reaction has subsided.

10. A process as claimed in claim 1, said digesting being effected for a period of 2 to 6 hours at a temperature of 94° to 100° C. and with the liquid medium of the reaction mass at an acid concentration of between 20 and 40%, calculated upon the amount of acid added to the suspension.

11. The process of producing a highly reactive, selectively sorptive particulate silicate material, which comprises: dispersing thoroughly in water fine particles of an anhydrous aluminum silicate produced by the heat treatment for at least two hours at a temperature between 700° and 900° C. of a finely divided kaolin the particles of which by weight are predominantly smaller than 10 microns in diameter; while vigorously agitating the slurry adding to it concentrated sulfuric acid in an amount equivalent to 95 to 100% of that which is stoichiometric to the alumina content of the dispersed silicate, the amounts of water and acid in the slurry providing in its liquid medium an acid concentration of between 30 and 50%, thus heating the slurry by the heat of dilution of the acid and bringing about in it a violent frothing reaction causing it to boil up violently in the reaction container; upon frothing of the slurry to several times its normal volume distributing over its surface relatively cold water in an amount sufficient to halt its expansion but insufficient to quench the violent reaction, and repeating such water addition from time to time as needed to control the frothing; when the frothing reaction has subsided adding to the slurry relatively cold water in an amount sufficient to reduce its temperature to 94° to 100° C. and to provide in its liquid medium a reduced acid concentration, computed upon the amount of acid added to it, of between 20 and 40%; then holding the slurry at a temperature of 94° to 100° C. for a period of 2 to 6 hours sufficient to bring the $SiO_2$ content of the particles suspended in it up to 83 to 92%; and then separating the reaction liquid from and washing and drying the resulting solid particles.

12. A process as claimed in claim 11, said reduced acid concentration being of approximately 30% whereby the aluminum sulphate content of the reaction liquid is readily recoverable.

13. A process according to claim 1, said violent reaction being initiated by a heating of the acidified suspension supplemental to the heating thereof effected by the addition of said acid.

References Cited
UNITED STATES PATENTS 3,328,125  6/1967  Mays et al. _____ 23—182

OSCAR R. VERTIZ, *Primary Examiner.*

ARTHUR GREIF, *Assistant Examiner.*

U.S. Cl. X.R.

252—450